(12) United States Patent
Stiesdal

(10) Patent No.: US 8,519,577 B2
(45) Date of Patent: Aug. 27, 2013

(54) GENERATOR WITH A STATOR COMPRISING COOLING DUCTS, AND METHOD FOR COOLING A LAMINATED STATOR OF A GENERATOR

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/383,980

(22) Filed: Mar. 31, 2009

(65) Prior Publication Data
US 2009/0256433 A1 Oct. 15, 2009

(30) Foreign Application Priority Data
Apr. 10, 2008 (EP) .................................... 08007144

(51) Int. Cl.
*H02K 9/20* (2006.01)
*H02K 9/00* (2006.01)
*H02K 1/00* (2006.01)

(52) U.S. Cl.
USPC ............... 310/54; 310/216.004; 310/216.008; 310/58; 310/59

(58) Field of Classification Search
USPC ........................ 310/216.004, 216.008, 52–64
See application file for complete search history.

(56) References Cited

U.S. PATENT DOCUMENTS

| | | | | |
|---|---|---|---|---|
| 3,574,325 A | * | 4/1971 | Agarwal | 188/156 |
| 3,743,867 A | * | 7/1973 | Smith, Jr. | 310/52 |
| 4,691,131 A | | 9/1987 | Nakano | |
| 6,184,599 B1 | * | 2/2001 | Okabe et al. | 310/64 |
| 6,469,407 B2 | * | 10/2002 | Welke et al. | 310/58 |
| 2005/0067905 A1 | * | 3/2005 | Maney et al. | 310/58 |
| 2006/0026820 A1 | * | 2/2006 | Rippel et al. | 29/609 |
| 2007/0024132 A1 | | 2/2007 | Salamah et al. | |
| 2007/0278869 A1 | * | 12/2007 | Taketsuna | 310/54 |

FOREIGN PATENT DOCUMENTS

| | | |
|---|---|---|
| CN | 101107767 A | 1/2008 |
| DE | 29707181 U1 | 7/1997 |
| DE | 19824202 C1 | 9/1999 |
| EP | 0627804 B1 | 12/1994 |
| EP | 1586769 A2 | 10/2005 |
| ES | 2233146 A1 | 6/2005 |
| JP | 11318055 A | 11/1999 |
| WO | WO 0074214 A1 | 12/2000 |
| WO | WO 0121956 A1 | 3/2001 |

* cited by examiner

Primary Examiner — Tran Nguyen
Assistant Examiner — Leda Pham

(57) ABSTRACT

A generator, for example of a wind turbine, includes two end plates and a plurality of stator laminate plates arranged between the two end plates, is described. Each laminate plate and each end plate comprise a number of cooling holes which are located such that the cooling holes of the laminate plates and the cooling holes of the end plates are aligned with each other to form a number of cooling ducts by the stator material itself. Furthermore, a method for cooling a laminated stator of a generator is described having a cooling fluid guided via a tubing from a cooling fluid reservoir into at least one a partly open cooling duct in the laminated stator.

23 Claims, 2 Drawing Sheets

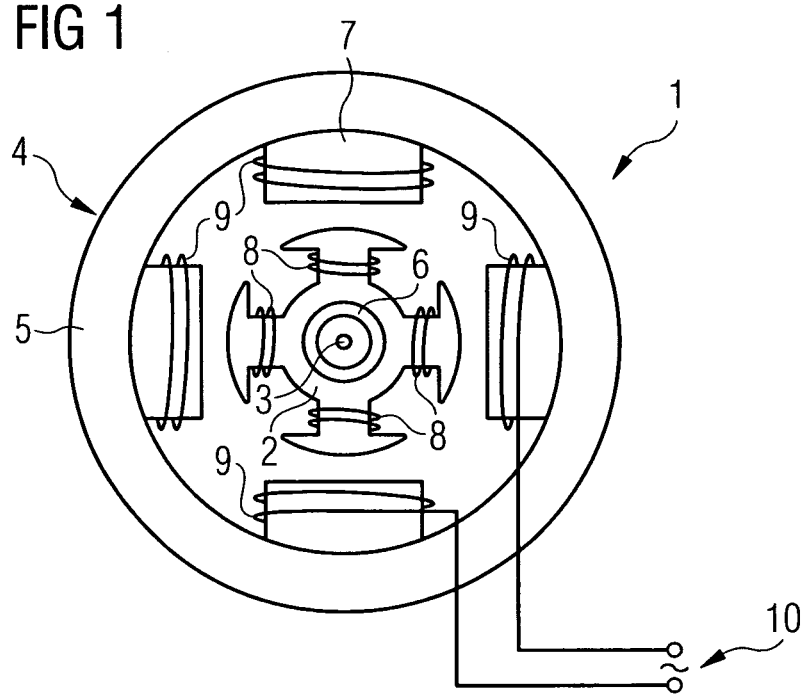
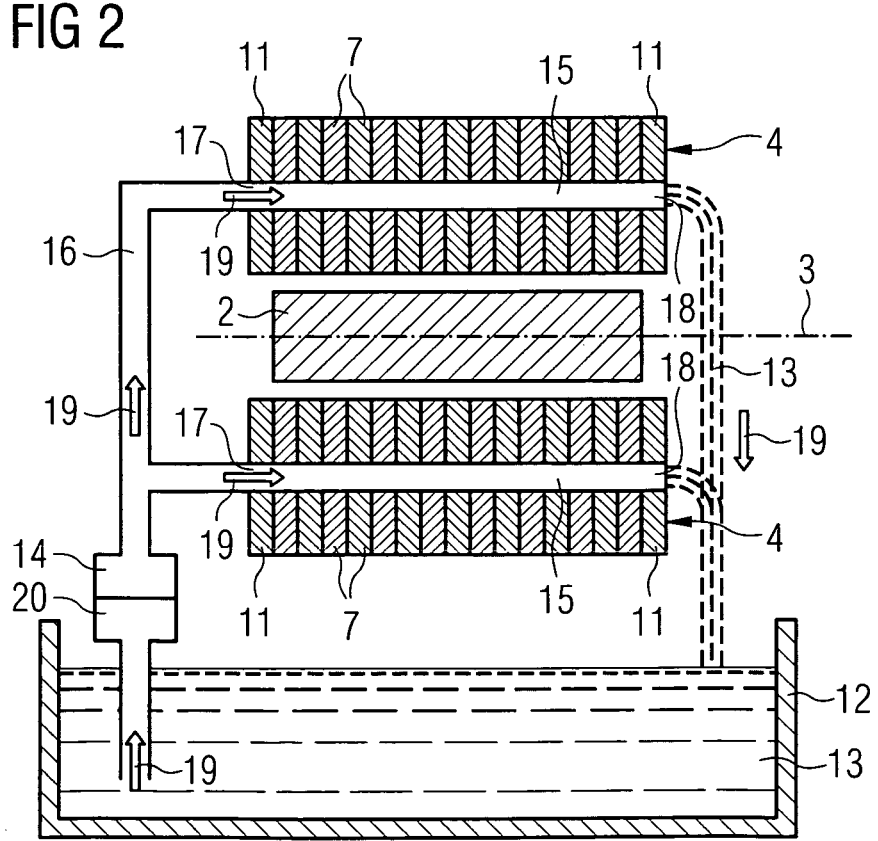

GENERATOR WITH A STATOR COMPRISING COOLING DUCTS, AND METHOD FOR COOLING A LAMINATED STATOR OF A GENERATOR

CROSS REFERENCE TO RELATED APPLICATIONS

This application claims priority of European Patent Office application No. 08007144.2 EP filed Apr. 10, 2008, which is incorporated by reference herein in its entirety.

FIELD OF INVENTION

The present invention relates to a generator with a stator made of laminate plates and comprising cooling ducts. It further relates to a method for cooling a laminated stator of a generator.

BACKGROUND OF INVENTION

High power generators, especially of modern wind turbines, produce large amounts of thermal energy, which must be dissipated to avoid damage to, for example, the electrical insulation of the generator. The cooling systems of wind turbine generators are typically based on air cooling or closed circuit water cooling.

In US 2007/0024132 A1 a wind turbine generator comprising a stator with heat pipes integrated in the stator yoke is described. The heat pipes run in axial direction. The heat is absorbed or transferred from the components into an evaporator section of the heat pipe, particularly a vaporisable liquid in the heat pipe. The heat pipe is arranged with respect to a stator core such that the evaporator section extends into and is received within a bore which is configured to receive a corresponding heat pipe.

A system of axially oriented cooling slits for air cooling in the stator of a wind turbine is presented in EP 1 586 769 A2.

In EP 0 627 804 A2 a dynamoelectric machine comprising a plurality of stacked laminations without end plates forming a stator core with air ducts passing through the entire length of the stator is disclosed. The stacked laminations have a central bore for passage of a rotor there through and a plurality of winding slots extending radially outward from the bore. A plurality of cooling air passages extend axially through the stacked laminations generally parallel to the central bore. Each of the air passages are positioned adjacent to the terminating end of a corresponding one of the winding slots.

In U.S. Pat. No. 4,691,131 a stator of an AC motor with axially oriented passages for cooling liquid is described. The laminated core is impregnated with a resin to fill gaps between adjacent laminations and coat inner surfaces of the cooling liquid passages so that cooling liquid will flow through the cooling liquid passages without leakage therefrom.

SUMMARY OF INVENTION

It is an objective of the present invention to provide an advantageous generator comprising a plurality of stator laminate plates. It is a second objective of the present invention to provide an advantageous wind turbine. It is another objective of the present invention to provide an advantageous method for cooling a laminated stator of a generator.

The first objective is solved by a generator as claimed in the independent claims. The second objective is solved by a wind turbine as claimed in the independent claims. The last objective is solved by a method for cooling a laminated stator of a generator as claimed in the independent claims. The depending claims define further developments of the invention. The features are advantageous separate and in combination with each other.

The inventive generator comprises two end plates and a plurality of stator laminate plates arranged between the two end plates. Each laminate plate and each end plate comprise a number of cooling holes which are located such that the cooling holes of the laminate plates and the cooling holes of the end plates are aligned with each other to form a number of cooling ducts by the stator material itself. The end plates may advantageously be used to compress the stator laminates to form the laminated stator core and at the same time provide support for the end loops of the stator coils. The holes may be punched in the stator laminates.

Forming the cooling ducts by the stator itself avoids the need for an impregnation or the need for an additional duct. A used cooling fluid, for example a liquid, comes directly into contact with the stator material and therefore effectively cools the stator material.

The inventive generator comprises a rotation axis and the cooling ducts may run parallel to the rotation axis. Moreover, the cooling ducts may extend throughout the entire length of the stator.

The cooling holes in one of the end plates can be fitted with nipples to which a tubing, for example a rubber or plate tubing, can be attached. Furthermore, the cooling holes in one of the end plates can be fitted with orifices. For example, the holes in one of the end plates may be fitted with nipples to which rubber or plastic tubing can be attached and the holes in the opposite end plate may be fitted with orifices that act as simple throttles for a liquid flow. The nipples at the first stator end plate facilitate piping. The orifices at the other end of the stator ensure even flow through all cooling ducts by ensuring that the pressure loss is generally concentrated at the end of the cooling ducts.

The inventive generator advantageously comprises a reservoir for a cooling fluid, for example a cooling liquid, which is in flow connection with the cooling ducts. Moreover, the generator may comprise a housing with a bottom, and the reservoir for the cooling fluid, for example a cooling liquid, may be located at the bottom of the housing and connected to the cooling ducts via the tubing. When the cooling fluid emerges from the ducts at the second end plate it may either run through pipes back to the pump or may simply be allowed to fall into the reservoir at the bottom of the generator housing.

The inventive generator can comprise a cooling liquid that is stable at high temperatures and has electrically insulating properties. The cooling liquid may, for example, be transformer oil.

The inventive generator may further comprise a pump for pumping the cooling fluid through a circuit comprising the cooling ducts. Generally, the generator can comprise an open cooling fluid circuit. For example, when the cooling fluid emerges from the ducts at the second end plate it may simply be allowed to fall into the reservoir at the bottom of the generator housing. Furthermore, the circuit may especially comprise a heat exchanger.

The inventive wind turbine comprises a generator as previously described. The inventive wind turbine has the same advantages as the inventive generator.

In the inventive method for cooling a laminated stator of a generator a cooling liquid is guided via a tubing from a cooling liquid reservoir into at least one partly open cooling duct in the laminated stator. Advantageously, the cooling liquid is pumped into the cooling duct.

The cooling liquid may be let to return to the reservoir under the influence of gravity alone. Preferably, a cooling liquid can be used which is stable at high temperatures and has electrically insulating properties. For example, transformer oil may be used as cooling liquid. Moreover, a cooling duct can be used which is formed by holes in the stator material itself.

The present invention provides a liquid-based cooling system for the stator of a generator, for example of wind turbine, where the walls of the cooling ducts are formed by the stator itself. This allows for direct thermal contact between the stator and the cooling fluid.

In addition, the cooling ducts are simple to manufacture, using well-known punching techniques. No cooling tubes need to be welded or braced onto the stator.

In the simplest form the system is partly open. Leakage may occur between adjacent stator laminates, but since the fluid is electrically insulating this does no harm and the cooling fluid returns to the reservoir under the influence of gravity alone. No conduits carrying the cooling fluid from the stator and back to the reservoir are necessary. This saves considerable costs in tubing and time for assembly.

BRIEF DESCRIPTION OF THE DRAWINGS

Further features, properties and advantages of the present invention will become clear from the following description of an embodiment in conjunction with the accompanying drawings.

FIG. 1 schematically shows a generator.

FIG. 2 schematically shows an inventive generator in a sectional view.

DETAILED DESCRIPTION OF INVENTION

Figure 3:
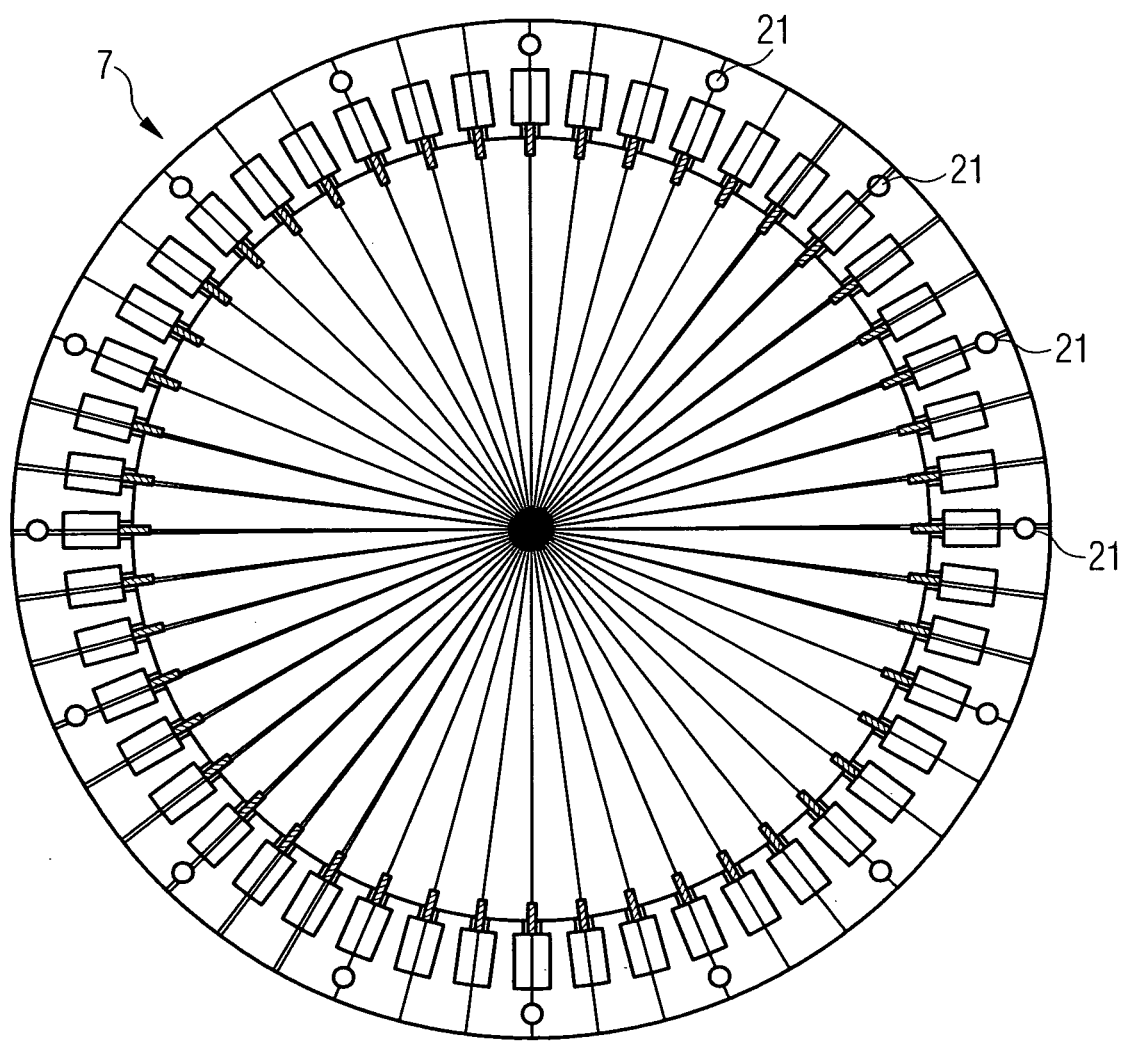
FIG. 3 schematically shows a stator laminate plate in a frontal view.

An embodiment of the present invention will now be described with reference to FIGS. 1 to 3. FIG. 1 schematically shows a generator in a simplified view. The generator 1 comprises a stator 4 and a rotor 2. The stator 4 comprises a stator housing 5, stator laminate plates 7 and stator inductor coils 9. The stator laminate plates 7 and the stator inductor coils 9 are located inside the stator housing 5. The stator inductor coils 9 are coiled up around the stator laminate plates.

The rotor 2 is located inside the stator housing 5 and is able to rotate about a rotation axis 3. The rotor 2 comprises a number of rotor inductor coils 8 for induction of an alternating magnetic field. The rotor inductor coils 8 are provided with DC current by means of a contact ring and a contact brush 6, for example.

The stator inductor coils 9 are connected to an electrical grid 10 for providing alternating current. The generator 1 converts mechanical energy, which causes a rotation of the rotor 2, to electrical energy by means of electromagnetic induction. In addition, the rotor 2 may also be connected to a grid, for example, in case of a doubly fed generator.

Note, that the generator in FIG. 1 is simplified and that a real generator comprises a larger number of poles.

FIG. 2 schematically shows an inventive generator in a sectional view along the rotation axis 3. The figure shows a rotor 2, a stator 4, and a cooling liquid circuit.

The stator 4 comprises a number of stator laminate plates 7 and two end plates 11. The stator laminate plates 7 are arranged between the two end plates 11. The end plates 11 are used to compress the stator laminates 7 to form the laminated stator core and at the same time provide support for the end loops of the stator coils 9. Each stator laminate plate 7 and each end plate 11 comprises a number of holes 21 which are located such that the holes 21 of the laminate plates 7 and the holes 21 of the end plates 11 are aligned with each other when the stator 4 is assembled to form a number of cooling ducts 15. The cooling ducts 15 are formed by the stator material itself, i.e. they are not covered by a resin or the like.

Each cooling duct 15 comprises a duct inlet 17 which is located in one of the end plates 11 and a duct outlet 18 which is located in the opposite end plate 11. The duct inlet 17 is connected to a reservoir 12 by means of a tubing 16. The reservoir 12 is filled with transformer oil as cooling liquid 13. Between the reservoir 12 and the duct inlet 17 a pump 14 and a heat exchanger 20 are located. The heat exchanger 20 can also be placed at another position. The cooling liquid 13 can be pumped by means of the pump 14 through the tubing 16 into the ducts 15. The direction of the cooling liquid flow is indicated by arrows 19. The cooling liquid 13 which has passed the ducts 15 of the stator 4 is let to return to the reservoir 12 under the influence of gravity alone. Alternatively, the cooling liquid 13 which has passed the ducts 15 can be returned back to the reservoir 12 by means of tubing.

The duct inlets 17 may be fitted with nipples which facilitate piping. Rubber or plastic tubing 16 can be attached to the nipples. Moreover, the duct outlets 18 can be fitted with orifices that act as simple throttles for the liquid flow. The orifices at the duct outlets 18 ensure even flow through all cooling ducts by ensuring that the pressure loss is generally concentrated at the end of the cooling ducts 15. When the cooling fluid 13 emerges from the ducts 15 at the duct outlet 18 it may either run through pipes back to the pump 14 or may simply be allowed to fall into the reservoir 12 at the bottom of the generator housing.

Generally, the cooling fluid can be transformer oil as in the present embodiment or a similar liquid that is stable at high temperatures and has good electrically insulating properties.

In the partly open system, which is shown in FIG. 2, leakage may occur between adjacent stator laminates 7, but since the fluid 13 is electrically insulating this does no harm, and the cooling fluid 13 returns to the reservoir 12 under the influence of gravity alone. No conduits carrying the cooling fluid 13 from the stator 4 and back to the reservoir 12 are necessary. This saves considerable costs in tubing and time of assembly.

In FIG. 2 the cooling ducts 15 are orientated parallel to the rotation axis 3. Of course, the ducts 15 can be orientated in another way. Moreover, the cooling ducts 15 extend throughout the entire length of the stator 4.

FIG. 3 schematically shows a stator laminate plate 7 for a real generator with a large number of poles in a frontal view. The stator laminate plate 7 comprises a plurality of holes 21 which are located near the outer diameter of the plate 7. Furthermore, the holes 21 are uniformly distributed along the perimeter of the plate 7. The cooling ducts 15 which are formed by the holes 21 are simple to manufacture, using well-known punching techniques. No cooling tubes need to be welded or braced onto the stator.

The inventive generator as well as the inventive method, wherein the stator cooling ducts 15 are formed by the stator 4 itself, allow for direct thermal contact between the stator 4 and the cooling fluid 13 and provides an effective cooling.

The invention claimed is:

1. A generator for supplying alternate current to an electrical grid, comprising:
   a stator, comprising:

two end plates,
a plurality of stator laminate plates arranged between the two end plates, and
a plurality of cooling ducts, each cooling duct includes a duct inlet formed in a first of the two end plates, a cooling hole formed in each of the plurality of stator laminate plates and a duct outlet formed in the second of the two endplates, wherein for each cooling duct the duct inlet, the cooling holes and duct outlet are aligned such that the respective cooling duct provides a cooling path for a cooling liquid to travel from the duct inlet to the duct outlet via the cooling holes, each the plurality of cooling ducts are thereby formed by a material of the stator itself;
a housing having a bottom; and
a reservoir for holding the cooling liquid is located at the bottom of the housing, the reservoir connected to the duct inlet of at least one of the plurality of cooling ducts via a tubing,
wherein the duct outlet of at least one of the plurality of cooling ducts is not attached to the reservoir so that the cooling liquid falls freely and unrestrained from said duct outlet into the reservoir thereby forming an open cooling circuit.

2. The generator as claimed in claim 1,
further comprises a rotor with a rotation axis,
wherein each of the plurality of cooling ducts is formed parallel to the rotation axis.

3. The generator as claimed in claim 2,
wherein each of the plurality of cooling ducts extends throughout the entire length of the stator.

4. The generator as claimed in claim 1,
wherein the each of the cooling holes in one of the end plates is fitted with an orifice.

5. The generator as claimed in any of the claim 1, further comprises
a pump for pumping the cooling liquid through a circuit comprising the plurality of cooling ducts.

6. The generator as claimed in claim 1,
wherein the circuit comprises a heat exchanger.

7. A wind turbine comprising:
a generator as claimed in claim 1.

8. The wind turbine as claimed in claim 7,
wherein each of the plurality of cooling ducts is formed parallel to the rotation axis and/or
wherein each of the plurality of cooling ducts extends throughout the entire length of the stator.

9. The wind turbine as claimed in claim 7,
wherein each laminate plate is circular and the outer perimeter is an outer circumference of the laminate plate; and wherein said plurality of cooling holes are regularly spaced apart over the outer circumference of the laminate plate.

10. The generator as claimed in claim 1,
wherein each laminate plate is circular and the outer perimeter is an outer circumference of the laminate plate; and wherein said plurality of cooling holes are regularly spaced apart over the outer circumference of the laminate plate.

11. A method for cooling a laminated stator of a generator as claimed in claim 1, the method comprising:
guiding the cooling liquid via the tubing from a cooling liquid reservoir into at least one the plurality of cooling ducts; and
returning the cooling liquid from the at least one of the plurality cooling ducts to the reservoir under the influence of gravity alone and without constraint.

12. The method as claimed in claim 11,
wherein the cooling liquid is stable at high temperatures and has electrically insulating properties.

13. The method as claimed in claim 11,
wherein each laminate plate is circular and the outer perimeter is an outer circumference of the laminate plate; and wherein said plurality of cooling holes are regularly spaced apart over the outer circumference of the laminate plate.

14. The method as claimed in claim 11, further comprising:
pumping the cooling liquid from the reservoir to the cooling ducts.

15. The method as claimed in claim 11,
wherein the cooling liquid is stable at high temperatures and has electrically insulating properties.

16. The method as claimed in claim 15,
wherein transformer oil is used as the cooling liquid.

17. The generator as claimed in claim 1,
wherein the duct inlet includes a nipple to which the tubing is attached.

18. The generator as claimed in claim 1,
wherein the cooling liquid is stable at high temperatures and has electrically insulating properties.

19. The generator as claimed in claim 18,
wherein transformer oil is used as the cooling liquid.

20. The generator as claimed in claim 1,
wherein the cooling ducts are formed by the material of the stator itself without the addition of a further material.

21. The generator as claimed in claim 20,
wherein the cooling ducts are formed by the material of the stator itself without the addition of a resin material.

22. The generator as claimed in claim 1,
a connection adapted connect the generator to the electrical grid to provide alternating current from the generator to the electrical grid.

23. The generator as claimed in claim 1,
wherein a cooling via the cooling ducts is during a power generation of the generator.

* * * * *